US012578078B2

(12) United States Patent
Van Bommel et al.

(10) Patent No.: US 12,578,078 B2
(45) Date of Patent: Mar. 17, 2026

(54) PHOSPHOR CONVERTED SUPERLUMINESCENT DIODE LIGHT SOURCE

(71) Applicant: SIGNIFY HOLDING B.V., Eindhoven (NL)

(72) Inventors: Ties Van Bommel, Horst (NL); Olexandr Valentynovych Vdovin, Maarheeze (NL); Martinus Petrus Joseph Peeters, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 233 days.

(21) Appl. No.: 18/285,244

(22) PCT Filed: Mar. 28, 2022

(86) PCT No.: PCT/EP2022/058153

§ 371 (c)(1),
(2) Date: Sep. 30, 2023

(87) PCT Pub. No.: WO2022/207568

PCT Pub. Date: Oct. 6, 2022

(65) Prior Publication Data

US 2024/0167667 A1 May 23, 2024

(30) Foreign Application Priority Data

Apr. 1, 2021 (EP) .................................... 21166516

(51) Int. Cl.
*F21V 9/30* (2018.01)
*F21V 9/20* (2018.01)
(Continued)

(52) U.S. Cl.
CPC .................. *F21V 9/30* (2018.02); *F21V 9/20* (2018.02); *F21V 9/38* (2018.02); *F21V 9/40* (2018.02); *F21Y 2115/00* (2016.08)

(58) Field of Classification Search
CPC ..... F21V 9/30; F21V 9/20; F21V 9/38; F21V 9/40
See application file for complete search history.

(56) References Cited

U.S. PATENT DOCUMENTS

2016/0010812 A1* 1/2016 Kroell ........................ F21K 9/64
353/84
2018/0066810 A1 3/2018 Lentine et al.
(Continued)

FOREIGN PATENT DOCUMENTS

CA 2907269 A1 4/2017
WO WO-2011092842 A1 * 8/2011 ........... G03B 21/208
WO WO-2014174560 A1 * 10/2014 ........... G02B 26/008

OTHER PUBLICATIONS

"Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: Aug. 3, 2020 https://doi.org/10.1002/9783527825264.ch9 in chapter 9.3.
(Continued)

*Primary Examiner* — Mariceli Santiago

(57) ABSTRACT

The invention provides a light generating system (1000), configured to generate system light (1001), wherein the light generating system (1000) comprises a light source (10), a first luminescent material (210), and a control system (300), wherein: —the light source (10) is configured to generate light source light (11) having a tunable spectral power distribution within a first wavelength range ($\Lambda_{x1}$); wherein the light source (10) comprises a superluminescent diode; —the first luminescent material (210) is configured to con-
(Continued)

vert at least part of the light source light (11) into first luminescent material light (211) having one or more wavelengths in a first luminescent material light wavelength range ($\Lambda_{m1}$); —the first luminescent material (210) is configured such that in an operational mode the system light (1001) comprises the first luminescent material light (211); —a spectral power distribution of the system light (1001) is controllable in dependence of the spectral power distribution of the light source light (11); and —the control system (300) is configured to control the spectral power distribution of the light source light (11).

15 Claims, 7 Drawing Sheets

(51) Int. Cl.

| | |
|---|---|
| ***F21V 9/38*** | (2018.01) |
| ***F21V 9/40*** | (2018.01) |
| ***F21Y 115/00*** | (2016.01) |

(56) References Cited

U.S. PATENT DOCUMENTS

| | | | | |
|---|---|---|---|---|
| 2019/0037185 | A1* | 1/2019 | Tarpan ................. | H04N 9/3182 |
| 2019/0097722 | A1 | 3/2019 | McLaurin et al. | |
| 2020/0192017 | A1 | 6/2020 | Dülk et al. | |
| 2020/0192204 | A1 | 6/2020 | Tarpan et al. | |
| 2020/0218142 | A1 | 7/2020 | Vetsuypens et al. | |
| 2020/0374004 | A1 | 11/2020 | McLaurin et al. | |

OTHER PUBLICATIONS

Alatawi et al., "High-power blue superluminescent diode for high CRI lighting and high-speed visible light communication", Optics Express (26355), vol. 26, No. 20, Oct. 2018, 10 pgs. XP55790998A.

Shen et al., "Semipolar InGaN-based superluminescent diodes for solid-state lighting and visible light communications", doi: 10.1117/12.2251144, photonics.kaust.edu.sa, Proc. of SPIE vol. 10104, Last reviewed Sep. 29, 2023. XP60083169A.

* cited by examiner

PHOSPHOR CONVERTED SUPERLUMINESCENT DIODE LIGHT SOURCE

CROSS-REFERENCE TO PRIOR APPLICATIONS

This application is the U.S. National Phase application under 35 U.S.C. § 371 of International Application No. PCT/EP2022/058153, filed on Mar. 28, 2022, which claims the benefit of European Patent Application No. 21166516.1, filed on Apr. 1, 2021. These applications are hereby incorporated by reference herein.

FIELD OF THE INVENTION

The invention relates to a light generating system. The invention also relate to a light generating device comprising such light generating system.

BACKGROUND OF THE INVENTION

Light apparatuses including a light source generating a blue-colored light, a phosphorus filter transforming the blue-colored light into white light, are known in the art. US2018066810, for instance, describes light apparatuses including a light source generating a blue-colored light, a phosphorus filter transforming the blue-colored light into white light, and a light dispersing element receiving the light and projecting a plurality of discrete points of light onto a target surface that have been transformed into white light by the phosphorus filter. US2018066810 also describes methods for creating a plurality of discrete points of light on a target surface using a light apparatus including a light source and a phosphorus filter and a light dispersing element, including generating a light using the light source, in which the generated light is blue-colored light, transforming the light into white light by passing the light through a phosphorus filter, and causing the light to be incident on the light dispersing element, such that the light dispersing element disperses the light and creates a plurality of individual points of light on the target surface.

US2019/097722A1 discloses a smart light source configured for visible light communication. The light source includes a controller comprising a modem configured to receive a data signal and generate a driving current and a modulation signal based on the data signal. Additionally, the light source includes a light emitter configured as a pump-light device to receive the driving current for producing a directional electromagnetic radiation with a first peak wavelength in the ultra-violet or blue wavelength regime modulated to carry the data signal using the modulation signal. Further, the light source includes a pathway configured to direct the directional electromagnetic radiation and a wavelength converter optically coupled to the pathway to receive the directional electromagnetic radiation and to output a white-color spectrum. Furthermore, the light source includes a beam shaper configured to direct the white-color spectrum for illuminating a target of interest and transmitting the data signal.

SUMMARY OF THE INVENTION

There is a desire for high intensity light generating devices and/or light generating devices have a controllable spectral power distribution of the light generated by the light generating device. Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

It surprisingly appears that, even though tunable over relatively narrow wavelength ranges, superluminescent diodes may provide a solution. Further, such solution may also have a reduced speckle (relative to laser-based solutions), but nevertheless have a relatively high intensity (like laser-based solutions).

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others describe, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) "is an emitter, which combines the features of laser diodes and light-emitting diodes. SLD emitters utilize the stimulated emission, which means that these devices operate at current densities similar to those of laser diodes. The main difference between LDs and SLDs is that in the latter case, we design the device waveguide in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications.

In a first aspect, the invention provides a light generating system, configured to generate system light, wherein the light generating system comprises a light source and a first luminescent material. Especially, the light generating system may further comprise a control system. In embodiments, the light source may be configured to generate light source light having a tunable spectral power distribution within a first wavelength range ($\Lambda_{x1}$). In specific embodiments the light source comprises a superluminescent diode. Especially, the first luminescent material is configured to convert at least part of the light source light into first luminescent material light having one or more wavelengths in a first luminescent material light wavelength range ($\Lambda_{m1}$). Further, in embodiments the first luminescent material may be configured such that in an operational mode (of the light generating system) the system light comprises the first luminescent material light. Especially, in embodiments a spectral power distribution of the system light may be controllable in dependence of the spectral power distribution of the light source light. Further, in specific embodiments the control system may be configured to control the spectral power distribution of the light source light. Hence, in specific embodiments the invention provides a light generating system, configured to generate system light, wherein the light generating system comprises a light source, a first luminescent material, and a control system, wherein: (a) the light source is configured to generate light source light having a tunable spectral power distribution within a first wavelength range ($\Lambda_{x1}$); wherein the light source comprises a superluminescent diode; (b) the first luminescent material is configured to convert at least part of the light source light into first luminescent material light having one or more wavelengths in a first luminescent material light wavelength range ($\Lambda_{m1}$); (c) the first luminescent material is configured such that in an operational mode (of the light generating system) the system light comprises the first luminescent material light; (d) a spectral power distribution of the system light is controllable in dependence of the spectral power distribution of the light source light; and (e) the control system is configured to control the spectral power distribution of the light source light. As indicated above, the first luminescent material may in embodiments be configured such that in an operational mode (of the light generating system) the system light comprises the first luminescent material light. Further, in embodiments the first luminescent material may be configured such that in an (other) operational mode (of the light generating system) the system light comprises the first luminescent material light and the light source light. In the latter operational mode, the spectral power distribution may thus be different from the spectral power distribution in the former operational mode.

As indicated above, such solution may provide a light generating system having a tunable spectral power distribution of the system light generated by the system. Further, such solution may also have a reduced speckle (relative to laser-based solutions), but nevertheless may have a relatively high intensity (like laser-based solutions).

The light generating system is especially configured to generate system light. Dependent upon the operational mode, the system light may comprise luminescent material light and/or light of the light source that is used to pump the luminescent material. The ratio of luminescent material light and the light source light may be controlled with a control system. Hence, the light generating system may especially comprise a light source, a first luminescent material, and a control system.

The term "light source" may also relate to a plurality of (essentially identical (or different)) light sources, such as 2-2000 light sources. In embodiments, the light source may comprise one or more micro-optical elements (array of micro lenses) downstream of the light source, or downstream of a plurality of light sources (i.e. e.g. shared by multiple light sources). Especially, the light source comprises a superluminescent diode.

In yet further specific embodiments, the light source may comprise a GaN-based superluminescent diode, or an InGaN-based superluminescent diode, or an AlGaN-based superluminescent diode. However, other embodiments may also be possible.

Especially, the light source may be configured to generate light source light having a tunable spectral power distribution within a first wavelength range ($\Lambda_{x1}$). This wavelength range may in embodiments have a width of at least about 5 nm, even more especially a width of at least about 10 nm. Some known SLD light sources may not be tunable over a width larger than about 40 nm. Hence, the first wavelength range ($\Lambda_{x1}$) within which the spectral power distribution may be tunable may e.g. be in the range of about 5-40 nm, such as about 5-30 nm, like up to about 20 nm. The phrase "tunable spectral power distribution within a first wavelength range ($\Lambda_{x1}$)", and similar phrases, may especially indicate that a centroid wavelength may be variable over a wavelength range as indicated, such as over a range of about 10-20 nm.

The term "centroid wavelength", also indicated as kc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

As indicated above, the light source light may be used to pump the luminescent material, though part of the light source light may also end up in the system light (see also below). Hence, the light source may be configured to provide primary radiation and part of the primary radiation is converted into secondary radiation. Secondary radiation may be based on conversion by a luminescent material. The secondary radiation may therefore also be indicated as luminescent material radiation. In specific embodiments the light source may be a light source that during operation emits at least light at wavelength selected from the range of 380-470 nm. However, other wavelengths may also be possible. This light may partially be used by the luminescent material.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq 0.2$, wherein $y1+y2=1$, wherein $0\leq y2\leq 0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the light source light). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq 0.1$, and wherein $0\leq y2\leq 0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq 0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq 0.2$, wherein $y1+y2=1$, wherein $0\leq y2\leq 0.2$. Especially, x3 is selected from the range of 0.001-0.1. Note that in embodiments $x2=0$. Alternatively or additionally, in embodiments $y2=0$.

In specific embodiments, A may especially comprise at least Y, and B may especially comprise at least Al.

In embodiments, the luminescent material may alternatively or additionally comprise one or more of $M_2S_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu 2+). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials. Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content. Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nanowires, etcetera. Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In specific embodiments, the first luminescent material may comprise a luminescent material of the type $A_3B_5O_{12}$:Ce, wherein A comprises one or more of Y, La, Gd, Tb and Lu, and wherein B comprises one or more of Al, Ga, In and Sc. Alternatively or additionally, the second luminescent material may also comprise a luminescent material of the type $A_3B_5O_{12}$:Ce, wherein A comprises one or more of Y, La, Gd, Tb and Lu, and wherein B comprises one or more of Al, Ga, In and Sc. However, the first luminescent material and the (optional) second luminescent material may especially be selected such that at irradiation with the light source light the respective luminescent material light (of the first luminescent material and the second luminescent material) have different spectral power distributions.

Especially, the first luminescent material may be configured to convert at least part of the light source light into first luminescent material light having one or more wavelengths in a first luminescent material light wavelength range (Anil). In general, all wavelengths within the first luminescent material wavelength range are larger than one or more, or even essentially all, wavelengths within the first wavelength range ($\Lambda_{x1}$). Especially, in embodiments a centroid wavelength of the luminescent material light may have a wavelength at least 15 nm, such as especially at least 20 nm larger than a centroid wavelength of the light source operated at maximum output.

The luminescent material may be configured downstream of the light source (in an operational mode). Note that in embodiments in an operational mode no light source light may be received by the first luminescent material. However, in one or more other operational modes, the first luminescent material may receive light from the light source. Hence, the first luminescent material is configured downstream of the light source.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Therefore, the first luminescent material is configured such that in an operational mode (of the light generating system) the system light comprises the first luminescent material light. In other words, in embodiments at one or more (primary) first wavelengths of the light sources light within the first wavelength range ($\Lambda_{x1}$) the first luminescent material may receive this light source light and convert into first luminescent material light and at one or more other (secondary) first wavelengths of the light sources light within the first wavelength range ($\Lambda_{x1}$) the first luminescent material may not receive this light source light or convert less light source light into first luminescent material light than at the one or more (primary) first wavelengths.

As indicated above, the light source light may have a tunable spectral power distribution. As at one or more (primary) first wavelengths of the light sources light within the first wavelength range ($\Lambda_{x1}$) the first luminescent material may receive this light source light and convert into first luminescent material light and at one or more other (secondary) first wavelengths of the light sources light within the first wavelength range ($\Lambda_{x1}$) the first luminescent material may not receive this light source light or convert less light source light into first luminescent material light than at the one or more (primary) first wavelengths, see also above, the relative contribution of the first luminescent material light to the spectral power distribution of the system light may vary in dependence of the spectral power distribution of the light source light.

There may be several embodiments to obtain the dependence of the spectral power distribution of the system light in dependence of the light source light (spectral power distribution).

In embodiments, the system light comprises in one or more operational modes both the light source light and the first luminescent material light. This may e.g. be the case when part of the light source light bypasses the first luminescent material light and/or when the first luminescent material partly converts the received light source light. Then, at least part of the light source light may propagate unconverted. In both embodiments, the system light may comprise the light source light and the first luminescent material light. Would the spectral power distribution of the light source light be tunable and would the absorption of the first luminescent material light not be even over the first wavelength range ($\Lambda_{x1}$) at one or more (primary) first wavelengths (within the first wavelength range ($\Lambda_{x1}$)) the conversion of the light source light may be higher than at one or more other (secondary) first wavelengths (within the first wavelength range ($\Lambda_{x1}$)). Hence, in embodiments the first luminescent material has a wavelength dependent first absorption strength (which varies) over at least part of the first wavelength range ($\Lambda_{x1}$), see further also below. This may also be the case when a color separation element may be configured between the light source light and the first luminescent material. Such color separation element may e.g. have a wavelength dependent transmission and/or a wavelength dependent reflection within the first wavelength range ($\Lambda_{x1}$). In this way, in dependence of the first wavelength the light may be reflected and/or transmitted in different directions. This may lead to a controllable contribution of the first luminescent material light to the spectral power distribution. However, as the light source light may also be admixed in the system light, this may also lead to a controllable contribution of the light source light to the system light and/or to a controllable contribution of converted light source light to the system light, would also a second luminescent material be applied, see further also below.

As indicated above, the absorption strength of the luminescent material in the first wavelength range ($\Lambda_{x1}$) may vary over this wavelength range ($\Lambda_{x1}$). For instance, between a maximum and a minimum in this wavelength range, there may be a different of at least 10%, relative to the maximum in this wavelength range, such as at least about 15% difference, like in specific embodiments at least about 20% difference, such as at least about 25% difference.

Therefore, in embodiments the spectral power distribution of the system light may be controllable in dependence of the spectral power distribution of the light source light. The variable spectral power distribution of the light source light may thus especially be used to control a ratio between the first luminescent material light and one or more of light source light and second luminescent material light.

Especially, in embodiments the control system may be configured to control the spectral power distribution of the light source light. Therefore, in embodiments the control system may control the spectral power distribution of the system light by controlling the spectral power distribution of the light source light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Wifi, ZigBee, BLE or WiMax, or another wireless technology.

The system, or apparatus, or device may execute an action in a "mode" or "operation mode" or "operational mode" or "mode of operation" or "control mode". Likewise, in a method an action or stage, or step may be executed in a "mode" or operation mode" or "operational mode" or "mode of operation" or "control mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed. The terms "operational mode", or "an operational mode", and similar terms, may refer (in embodiments) to one or more operational modes.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

As indicated above, in embodiments the first luminescent material has a wavelength dependent first absorption strength over at least part of the first wavelength range ($\Lambda_{x1}$). Hence, the first absorption strength may vary over at least part of the first wavelength range ($\Lambda_{x1}$). For instance, would at a primary first wavelength the absorption strength be higher than at a secondary first wavelength, a ratio of the intensity of the first luminescent material light to the intensity of the light source light may be larger at the primary first wavelength than a ratio of the intensity of the first luminescent material light and the intensity of the light source light at the secondary first wavelength. Hence, the absorption strength at the primary first wavelength may be higher than at the secondary first wavelength, and may thus vary over the first wavelength range.

In embodiments, the light source (and first luminescent material) may be chosen such that the light source may generate light source light having in an operational mode a centroid wavelength at a primary first wavelength ($\lambda_{101}$) and a second operational mode (e.g. at another current) a centroid wavelength at a secondary first wavelength ($\lambda_{102}$). In embodiments, one of the primary first wavelength and the secondary first wavelength may be at a wavelength that is not within the wavelength range of an excitation maximum and full width half maximum. In further specific embodiments, one of the primary first wavelength and the secondary first wavelength may be at a wavelength that is not within the wavelength range of an excitation maximum and a third of the excitation maximum (full width ⅓ maximum), even more especially not within the wavelength range of an excitation maximum and a quart of the excitation maximum (full width ¼ maximum). However, especially both the primary first wavelength and the secondary first wavelength are at least within the range of 0.1 maximum intensity (full width 1/10 maximum). Hence, assume a maximum of the excitation spectrum at wavelength x1 nm, a full width half maxima at x2a nm and x21b nm, third width half maxima at x3a and x3b nm, and 1/10 width half maxima at x4a and x4b. Especially, $x4a<x3a<x2a<x1<x2b<x3b<x4b$. Further, e.g. $x4a<\lambda_{101}<x2a$ or $x2b<\lambda_{102}<x4b$ when one of the primary first wavelength and the secondary first wavelength may be at a wavelength that is not within the wavelength range of an excitation maximum and full width half maximum, and when both the primary first wavelength and the secondary first wavelength are at least within the range of 0.1 maximum intensity (full width 1/10 maximum). Likewise this may apply for the other indicated embodiments, such as e.g. $x4a\leq\lambda_{101}<x3a$ or $x3b>\lambda_{102}\geq x4b$ when one of the primary first wavelength and the secondary first wavelength may be at a wavelength that is not within the wavelength range of an excitation maximum and full width ⅓ maximum, and when both the primary first wavelength and the secondary first wavelength are at least within the range of 0.1 maximum intensity (full width 1/10 maximum). Especially, the other one of the primary first wavelength and the secondary first wavelength of the centroid wavelengths of light source light in the different operational modes may be within the range of the maximum and full width half maximum, i.e. $x2a \leq \lambda_{101} \leq x1$ or $x1 \geq \lambda_{102} \geq x4b$. In specific embodiments, $|\lambda_{102}-\lambda_{101}|$ is at least 15 nm, such as especially at least 20 nm.

As indicated above, the luminescent material may partly convert the light source light. This may be the case in a transmissive mode or in a reflective mode. The non-converted light source light may in embodiment propagate together with the first luminescent material light.

In specific embodiments, the light source and the first luminescent material may be configured such that in an operational mode over at least part of the first wavelength range ($\Lambda_{x1}$) the system light comprises the light source light and the first luminescent material light. The phrase "over at least part of the first wavelength range ($\Lambda_{x1}$)" may include specific embodiments wherein the spectral power distribution of the light source light may be chosen such that conversion by the first luminescent material may be very low, or even essentially zero, dependent upon the wavelengths and the first luminescent material, and/or may include embodiments wherein the spectral power distribution of the light source light may be chosen such that conversion by the first luminescent material may be partial, dependent upon the wavelengths and the first luminescent material, and/or wherein the spectral power distribution of the light source light may be chosen such that conversion by the first luminescent material may be very high, or even essentially a full conversion, dependent upon the wavelengths and the first luminescent material. In this way, the ratio of the first luminescent material light and the light source light may be controllable by controlling the spectral power distribution of the light source light.

Hence, the phrase "the light source and the first luminescent material may be configured such that in an operational mode over at least part of the first wavelength range ($\Lambda_{x1}$) the system light comprises the light source light and the first luminescent material light" and similar phrases may also be indicated as that the light source and the first luminescent material may be configured such that in an operational mode (of the system) the system light comprises the light source light and the first luminescent material light. As indicated above, the term "an operational mode" may also refer to one or more operational modes. At one or more different wavelengths within the first wavelength range ($\Lambda_{x1}$), the light source light may excite the first luminescent material, which leads to at least partial conversion into first luminescent material light, which may be comprise by the system light. Hence, as part of the light source light may be partially converted and/or may be rerouted in embodiments, the system light may also comprise (unconverted) light source light. Therefore, over at least part of the first wavelength range ($\Lambda_{x1}$) the system light may in embodiments comprises the light source light and the first luminescent material light. Hence, in embodiments the light source and the first luminescent material may be configured such that in an operational mode at different wavelengths of the light source light selected from (at least part of) the first wavelength range ($\Lambda_{x1}$) the system light comprises the light source light and the first luminescent material light, wherein the first luminescent material light is based on partial) conversion of the light source light at the different wavelengths by the first luminescent material.

Hence, in specific embodiments the control system may be configured to control in an operational mode an intensity of the first luminescent material light by changing the spectral power distribution of the light source light (received by the first luminescent material) from a first light source light spectral power distribution ($\Lambda 1a$) to a second light source light spectral power distribution ($\Lambda 1b$) different from the first light source light spectral power distribution ($\Lambda 1a$).

In specific embodiments, the first wavelength range ($\Lambda_{x1}$) has wavelengths in the blue wavelength range. Alternatively or additionally, in (other) specific embodiments the first luminescent material light wavelength range ($\Lambda_{m1}$) has wavelengths in a wavelength range comprising one or more of (i) at least part of the green wavelength range, (ii) at least part of the orange wavelength range, and (iii) at least part of the red wavelength range. Yet alternatively or additionally, in (other) specific embodiments the first luminescent material light wavelength range ($\Lambda_{m1}$) has wavelengths in a wavelength range comprising one or more of (i) at least part of the green wavelength range, (ii) at least part of the yellow wavelength range, (iii) at least part of the orange wavelength range, and (iv) at least part of the red wavelength range.

The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. Lime light may have one or more wavelengths within the 560-570 nm wavelength range.

In embodiments, light source light that is not absorbed by the first luminescent material may be comprised in the system light. Alternatively or additionally, light source light that is not absorbed by the first luminescent material may be converted by a second luminescent material into second luminescent material light, which may be comprised by the system light.

As indicated above, the wavelength dependence of the excitation of the first luminescent material in combination with the spectral power distribution controllability of the first luminescent material may provide a (specific) controllability of the spectral power distribution of the system light. Alternatively or additionally, the wavelength dependence of a color separation element in combination with the spectral power distribution controllability of the first luminescent material may provide a (specific) controllability of the spectral power distribution of the system light.

Hence, in specific embodiments the light generating system may further comprise a color separation element configured downstream of the light source. The color separation element may also be configured upstream of the first luminescent material (and/or of the second luminescent material). Nevertheless, herein operational modes may in embodiments not be excluded wherein no light source light reaches the first luminescent material and/or the (optional) second luminescent material. Hence, in specific embodiments the light generating system may further comprise a color separation element configured downstream of the light source and configured upstream of the first luminescent material and/or the (optional) second luminescent material.

Especially, in embodiments the light source, the color separation element, and the first luminescent material may be configured such that one or more of the following applies: (i) a first part (11*b*) of the light source light is directed from the color separation element to the first luminescent material and (ii) a second part (11*a*) of the light source light is not directed from the color separation element to the first luminescent material.

Dependent upon the selectiveness of the color separation element, e.g. the steepness of e.g. a transmission or reflection curve, as well as the tunability of the spectral power distribution of the light source light one may provide e.g. operational modes selected from the below list:

(i) a first part (11*b*) of the light source light is directed from the color separation element to the first luminescent material but no second part (11*a*) of the light source light is directed from the color separation element to the first luminescent material;

(ii) no first part (11*b*) of the light source light is directed from the color separation element to the first luminescent material but a second part (11*a*) of the light source light is directed from the color separation element to the first luminescent material;

(iii) a first part (11*b*) of the light source light is directed from the color separation element to the first luminescent material and (ii) a second part (11*a*) of the light source light is not directed from the color separation element to the first luminescent material;

(iv) both a first part (11*b*) of the light source light is directed from the color separation element to the first luminescent material and a second part (11*a*) of the light source light is directed from the color separation element to the first luminescent material.

(v) a relatively larger first part (11*b*) of the light source light is directed from the color separation element to the first luminescent material and a relatively smaller second part (11*a*) of the light source light is directed from the color separation element to the first luminescent material, wherein "relatively larger" and "relatively smaller" may refer to a percentage relatively to the total spectral power distribution of the light source light that reached the color separation element;

(vi) a relatively smaller first part (11*b*) of the light source light is directed from the color separation element to the first luminescent material and a relatively larger second part (11*a*) of the light source light is directed from the color separation element to the first luminescent material, wherein "relatively larger" and "relatively smaller" may refer to a percentage relatively to the total spectral power distribution of the light source light that reached the color separation element.

Hence, in embodiments a ratio of the first part to the second part depends on the spectral power distribution of the light source light. Therefore, in specific embodiments the invention provides a light generating system further comprising a color separation element configured downstream of the light source, wherein: (a) the light source, the color separation element, and the first luminescent material are configured such that one or more of the following applies: (i) a first part (11*b*) of the light source light is directed from the color separation element to the first luminescent material and (ii) a second part (11*a*) of the light source light is not directed from the color separation element to the first luminescent material; and (b) a ratio of the first part to the second part depends on the spectral power distribution of the light source light.

The phrase "a first part (11*b*) of the light source light is directed from the color separation element to the first luminescent material and (ii) a second part (11*a*) of the light source light is not directed from the color separation element to the first luminescent material", and similar phrases may especially refer to embodiments wherein, when light source light is available that is not directed to the first luminescent material, at least part of that light source light may be used to one or more of (i) bypassing the luminescent material and becoming a component of (or defining) the system light, and (ii) guiding to a second luminescent material, being at least partly converted into second luminescent material light, with the second luminescent material light (and optionally remaining unconverted light source light) becoming a component of (or defining) the system light.

Hence, in embodiments the first luminescent material and the color separation element may be configured such that in an operational mode (of the light generating system) the system light comprises the first luminescent material light. Further, in embodiments the first luminescent material and the color separation element may be configured such that in an (other) operational mode (of the light generating system) the system light comprises the first luminescent material light and the light source light. In the latter operational mode, the spectral power distribution may thus be different from the spectral power distribution in the former operational mode.

Therefore, in specific embodiments the color separation element may especially be selected from the group of a dichroic mirror, a dichroic cube, and a diffractive optical element.

Hence, in specific embodiments the light generating system may further comprise a dichroic element, configured to transmit or reflect the light and configured to reflect or transmit the luminescent material light. The dichroic element may be an embodiment of a color separation element, such as described in U.S. Pat. No. 7,070,300, which is herein incorporated by reference. Especially, the color separation element may be selected from the group of a dichroic mirror, a dichroic cube, and a diffractive optical element. Optionally, the color separation element maybe provided using a hologram. Especially, the dichroic element may be a dichroic mirror or reflector.

The dichroic mirror may be a bandpass dichroic mirror. The dichroic mirror may be a shortpass dichroic mirror or a longpass dichroic mirror. The color separation element, especially the dichroic mirror, may have a cutoff wavelength within the first wavelength range, especially in about the middle of the wavelength range. For instance, when the first wavelength range wherein the centroid wavelength of the light source light is variable is x nm wide (such as 5-30 nm wide; see also above), then the cutoff wavelength may be selected within the first wavelength range at a distance of at least about 0.1*x from the lower end of the x nm wide wavelength range, such as 0.25*x from the lower end of the x nm wide wavelength range, and at maximum about 0.9*x from the lower end of the x nm wide wavelength range, such as at maximum about 0.75*x from the lower end of the x nm wide wavelength range. For instance, assuming a first wavelength range wherein the centroid wavelength of the light source light may be variable between about 440-460 nm, the wavelength range if 20 nm wide, with would provide—assuming the 0.1-0.9 range as indicated above—define a cutoff wavelength in the range of 442-458 nm or 440-456 nm—assuming the 0.1-0.9 range as indicated above. Especially, in embodiments the cutoff wavelength may be selected within the first wavelength range at a distance of at least about 0.4*x from the lower end of the x nm wide wavelength range, and at maximum about 0.6*x from the lower end of the x nm wide wavelength range.

As indicated above, light source light that is not directed to the first luminescent material light may (nevertheless) end up in the system light. To this end, one or more light combining elements may be applied.

Hence, in embodiments the light generating system may further comprising one or more light combining elements. Especially, in embodiments the light source, the color separation element, and the first luminescent material may be configured such that the second part (11*a*) of light source light is directed from the color separation element to one or more of the one or more light combining elements. Further, especially the one or more light combining element may be configured to combine the first luminescent material light and the second part (11*a*) of light source light. In specific embodiments, in an operational mode the system light comprises the first luminescent material light and/or the second part (11*a*) of light source light. Hence, in specific embodiments the system may comprise one or more light combining elements, wherein: (a) the light source, the color separation element, and the first luminescent material are configured such that the second part (11*a*) of light source light is directed from the color separation element to one or more of the one or more light combining elements; (b) the one or more light combining element are configured to combine the first luminescent material light and the second part (11*a*) of light source light; and (c) in an operational mode the system light comprises the first luminescent material light and the second part (11*a*) of light source light.

As also indicated above, light source light that is not directed to the first luminescent material light may (nevertheless) end up in the system light as converted light source light that has been converted by a second luminescent material.

For examples of the first luminescent material and the second luminescent material it is referred to the above. Note that in embodiments the first luminescent material light and the second luminescent material light have different spectral power distributions. Hence, especially they may have different color points.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

When a second luminescent material is applied, the second luminescent material light may end up in the system light (also) via one or more light combining elements.

Hence, in yet further specific embodiments the light generating system may further comprising one or more light combining elements (such as described above), and a second luminescent material. Especially, in embodiments the second luminescent material may be configured to convert at least part of the light source light into second luminescent material light having one or more wavelengths in a second luminescent material light wavelength range ($\Lambda_{m2}$). Yet further, in embodiments the first luminescent material light and the second luminescent material light may (thus) have different spectral power distributions (see also above). Especially in embodiments the light source, the color separation element, and the second luminescent material may be configured such that the second part (11*a*) of light source light may be directed from the color separation element to second luminescent material. Further, the one or more light combining element may especially be configured to combine the first luminescent material light and the second luminescent material light.

In specific embodiments, in an operational mode the system light may comprise one or more of the first luminescent material light and the second luminescent material light. As can also be derived from the above, dependent upon the selectiveness of the color separation element, e.g. the steepness of e.g. a transmission or reflection curve, as well as the tunability of the spectral power distribution of the light source light one may provide e.g. operational modes wherein:

(i) the system light may comprise non-converted light source light that propagates along with the first luminescent material light;

(ii) the system light may comprise non-converted light source light that propagates along with the second luminescent material light;

(iii) the system light may comprise non-converted light source light that bypassed the first luminescent material and the optional second luminescent material;

(iv) the system light may comprise non-converted light source light that bypassed the first luminescent material and the optional second luminescent material and essentially no first luminescent material light or second luminescent material light;

(v) when there is essentially full conversion and/or the remaining light source light source light is filtered out, the system light may essentially only comprise first luminescent material light;

(vi) when there is essentially full conversion and/or the remaining light source light source light is filtered out, the system light may essentially only comprise second luminescent material light;

(vii) when there is essentially full conversion and/or the remaining light source light source light is filtered out, the system light may essentially only comprise first luminescent material light and second luminescent material light.

Hence, in embodiments the light generating system may further comprising one or more light combining elements, and a second luminescent material, wherein: (a) the second luminescent material is configured to convert at least part of the light source light into second luminescent material light having one or more wavelengths in a second luminescent material light wavelength range (Λm2); (b) the first luminescent material light and the second luminescent material light have different spectral power distributions; (c) the light source, the color separation element, and the second luminescent material are configured such that the second part (11*a*) of light source light is directed from the color separation element to second luminescent material; (d) the one or more light combining element are configured to combine the first luminescent material light and the second luminescent material light; and (e) in an operational mode the system light comprises the first luminescent material light and the second luminescent material light (and/or in other operational modes the system light may comprise the first luminescent material light or the second luminescent material light.

In embodiments, the control system may be configured to control in an operational mode an intensity of the first luminescent material light by changing the spectral power distribution of the light source light from a first light source light spectral power distribution (Λ1*a*) to a second light source light spectral power distribution (Λ1*b*) different from the first light source light spectral power distribution (Λ1*a*). Alternatively or additionally, in embodiments, the control system may be configured to control in an operational mode an intensity of the second luminescent material light by changing the spectral power distribution of the light source light from a first light source light spectral power distribution (Λ1*a*) to a second light source light spectral power distribution (Λ1*b*) different from the first light source light spectral power distribution (Λ1*a*).

Optical elements that may be used to discriminate on the basis of spectral power distribution may in specific embodiments also be applied to combine light having different spectral power distributions. In embodiments, the one or more light combining element are selected from the group of a dichroic mirror and a dichroic cube.

Note that the above embodiments referred in general to a light source, a first luminescent material, an optional third luminescent material, and an optional color separation element. This does not exclude embodiments wherein other light sources may be applied, of which the light may also end up—in operational modes—in the system light, and which may be controlled by the control system. This also does not exclude the use of arrangements of such systems, forming a larger system, of which system light—in operational modes—may be combined in combined system light. Further, this also does not exclude the use of a plurality of light sources, such as in specific embodiments a plurality of superluminescent diodes of the same bin.

The control system may control the spectral power distribution of the light source. This may be done by controlling the electrical current through the light source. With varying electrical current, the spectral power distribution may vary. In this way the spectral power distribution can be controlled, see e.g. also Abdullah A. Alatawi, et al., Optics Express Vol. 26, Issue 20, pp. 26355-26364, https://doi.org/10.1364/0E.26.026355. Hence, in embodiments the spectral power distribution of the light source light is controllable by controlling a current to the light source.

In embodiments, the control system may be configured to control in an operational mode an intensity of the first luminescent material light by changing the spectral power distribution of the light source light from a first light source light spectral power distribution (Λ1*a*) to a second light source light spectral power distribution (Λ1*b*) different from the first light source light spectral power distribution (Λ1*a*). Note that the phrase "first light source light spectral power distribution (Λ1*a*) to a second light source light spectral power distribution (Λ1*b*)", and similar phrases, do not exclude other light source light spectral power distributions, such as intermediate light source light spectral power distributions of the light source light.

When controlling a current to the light source the centroid wavelength of the light source light may be controlled. As indicated above, the spectral power distribution of the light source light may be controlled. It appears that not only the spectral power distribution may vary with the current to (through) the light source, but that also the output varies. This may have the effect that with increasing (or decreasing) current, not only the spectral power distribution shifts, but also the intensity increases or decreases. This might imply that the spectral power distribution of the system light is not only variable, but may also imply that the intensity varies. The latter, however, may not always be desirable. For instance, for (general) lighting application it may be desirable that the intensity of the system light is controllable over at least part of an intensity range independent of the spectral power distribution. Alternatively or additionally, for (general) lighting application it may be desirable that the spectral power distribution of the system light is controllable over at least part of an possible spectral power distribution independent of the intensity of the system light. This would e.g. allow two operational modes with different correlated color temperatures (CCT) at e.g. the same intensity (in Watts).

Therefore, in embodiments the intensity of the light source light may (further) be controlled with pulse-width modulation. As known in the art, pulse width modulation (PWM), or pulse duration modulation (PDM), is a method of controlling the average power delivered by an electrical signal, by effectively chopping it up into discrete parts. The time duration of the pulses and/or the interval between the pulses may be controllable. In this way, it may be possible to control the spectral power distribution of the light source light (at least partly) independent of the output of the light source light.

For instance, driving the SLD at an average current of 100 mA can be done in several ways, resulting in different spectra: 100 mA DC versus 1A pulsed (with a duty cycle of 10%). In this way the intensity remains essentially constant, but the spectral power distributions differ.

Therefore, in embodiments the spectral power distribution of the light source light may be controllable by controlling a current to the light source, and the control system may (further) be configured to control an intensity of the light source light by pulse-width modulation.

As the spectral power distribution may be controllable, in embodiments of the system it may be possible to provide system light having a controllable correlated color temperature, a controllable color rendering index, and a controllable color point. In embodiments the light source and the first luminescent material may be configured such that over at least part of the first wavelength range ($\Lambda_{x1}$) the system light is white light. Further, in embodiments the light source, the first luminescent material, and the color separation element (and the one or more light combining elements) may be configured such that (in an operational mode) over at least part of the first wavelength range ($\Lambda_{x1}$) the system light is white light. Further, in embodiments the light source, the first luminescent material, the color separation element, and the second luminescent material (and the one or more light combining elements) may be configured such that (in an operational mode) over at least part of the first wavelength range ($\Lambda_{x1}$) the system light is white light.

In embodiments the light source, the first luminescent material and an optional further source of light may be configured such that (in an operational mode) over at least part of the first wavelength range ($\Lambda_{x1}$) the system light is white light. Further, in embodiments the light source, the first luminescent material, the color separation element, and an optional further source of light (and the one or more light combining elements) may be configured such that (in an operational mode) over at least part of the first wavelength range ($\Lambda_{x1}$) the system light is white light. Further, in embodiments the light source, the first luminescent material, the color separation element, the second luminescent material, and an optional further source of light (and the one or more light combining elements) may be configured such that (in an operational mode) over at least part of the first wavelength range ($\Lambda_{x1}$) the system light is white light. The further source of light, may, as also be indicated above, be a light source, like a solid state light source, or a system as described herein, etc. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments the light source and the first luminescent material, and the optional second luminescent material, may be configured such that (in an operational mode) over at least part of the first wavelength range ($\Lambda_{x1}$) the system light may be white light. As can be derived from the above, the first luminescent material, and the optional second luminescent material, may thus be configured such that (in an operational mode) the system light may be white light. Therefore, in embodiments the light source and the first luminescent material, and the optional second luminescent material may be configured such that in an operational mode at different wavelengths of the light source light selected from (at least part of the first wavelength range ($\Lambda_{x1}$), the system light is white light based on (partial) conversion of the light source light at the different wavelengths by the first luminescent material and optionally by the second luminescent material; and wherein the control system is configured to control one or more of the color rendering index and the correlated color temperature of the system light.

Especially, in embodiments the control system may be configured to control one or more of the color rendering index and the correlated color temperature of the system light.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein. The light generating device may comprise a housing or a carrier, configured to house or support, one or more elements of the light generating system.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
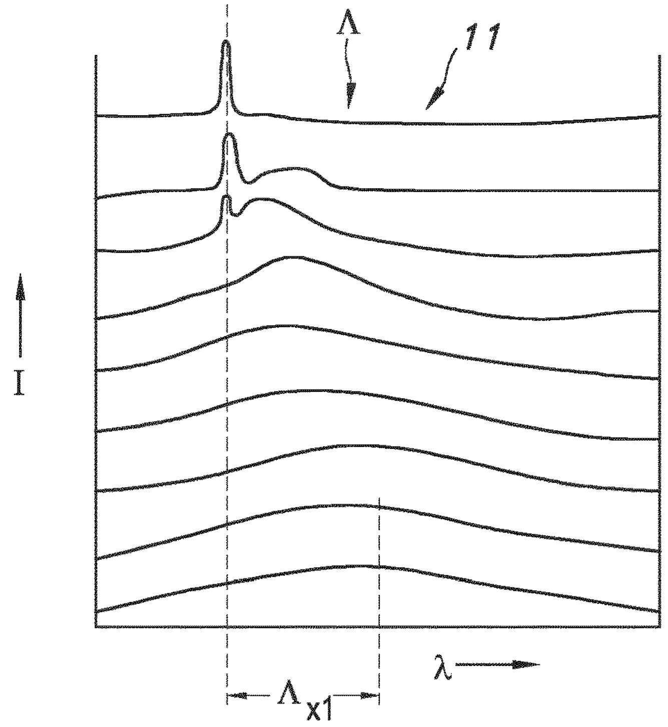
FIG. 1 schematically depicts the spectral power distribution as function of the current.

FIG. 1 schematically depicts the spectral power distribution of the emission of a superluminescent diode as function of the current. By way of example, with increasing current, there is a blue shift. Hence, the spectral power distribution can be controlled as function of the current trough the solid state light source, especially the super luminescent diode. Here, all spectral power distributions are normalized. Nine curves have schematically been depicted, in the order of decreasing or increasing current (see also e.g. Szymon Stanczyk et al., paragraph 9.3, FIG. 9.7).

However, it appears that with decreasing current also the intensity of the light source light may decrease. In order to compensate at least part for this effect, pulse-width modulation may be applied. Hence, the spectral power distribution of the light source light 11 is controllable by controlling a current to the light source 10, and the control system (not depicted) may configured to control an intensity of the light source light 11 by pulse-width modulation.

On the x-axis, the wavelength is indicated, and on the y-axis the (normalized) intensity. Here, the first wavelength range $\Lambda_{x1}$ may effectively indicate the wavelength range over which the centroid wavelength may be controlled. This wavelength range is smaller than the wavelength range over which the SLD may provide at one or more of the currents.

FIGS. 2a-2e schematically depict an embodiment and aspects in relation thereto wherein the system 1000 comprises a light source 10 and a first luminescent material 210.

Figure 2A:
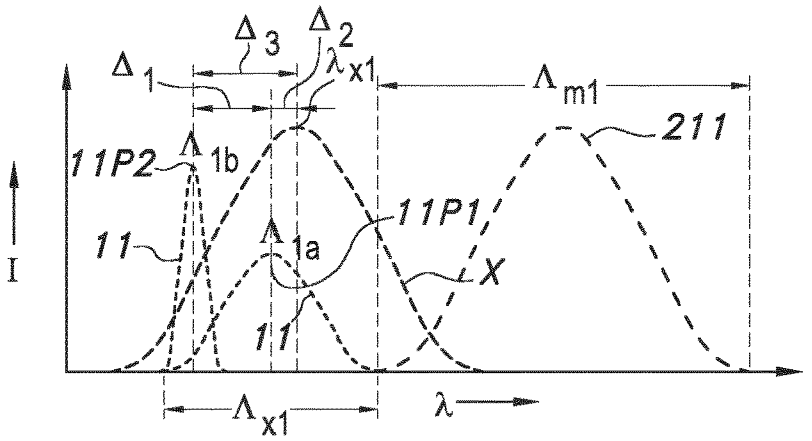
FIGS. 2*a*-2*e* schematically depicts some embodiments and aspects.
Figure 2B:
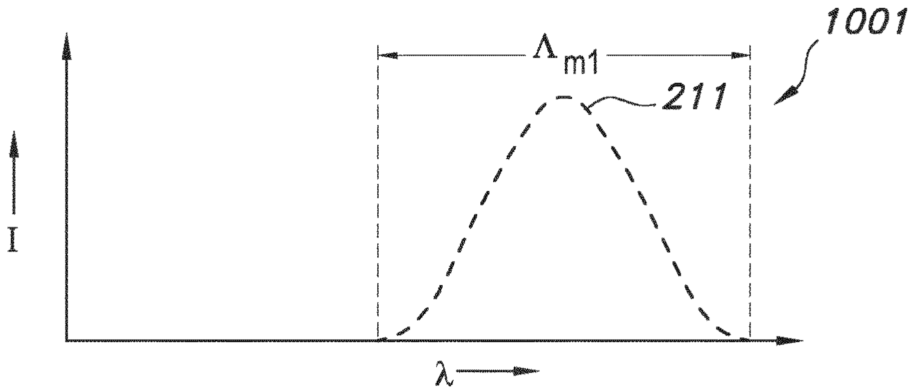
Figure 2C:
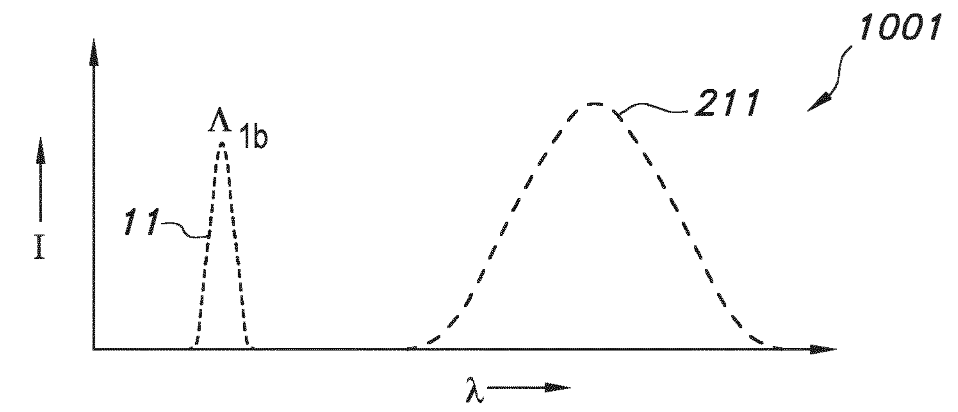
Figure 2D:
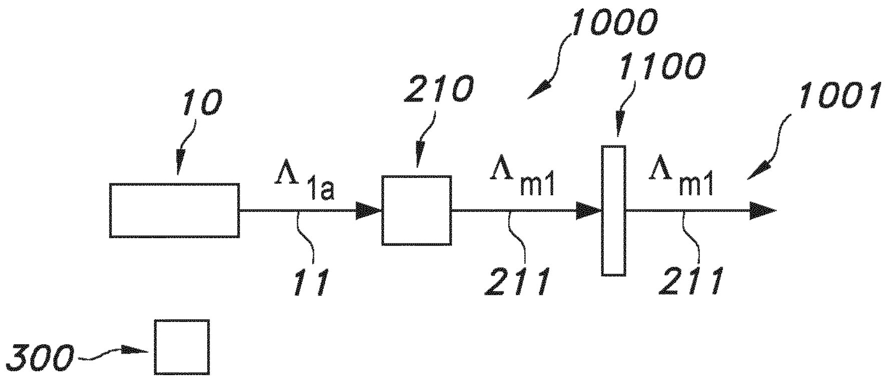
Figure 2E:
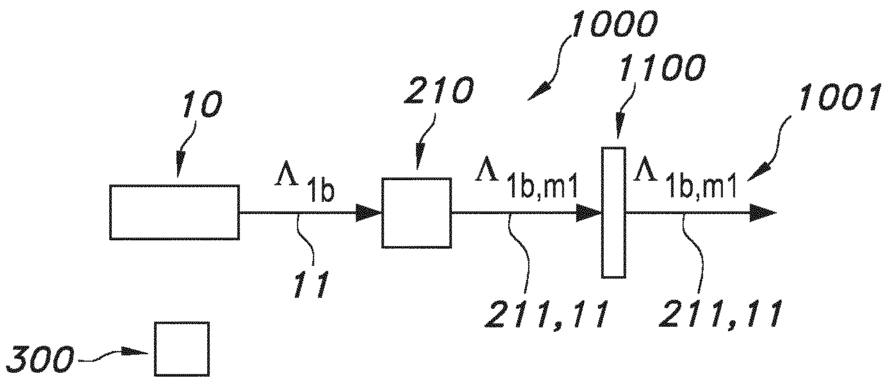

FIG. 2a schematically depicts the excitation spectrum, indicated with reference X and the emission spectrum or luminescent material light (spectral power distribution) 211 of a (first) luminescent material 210 (see FIGS. 2d-2e). With reference to the excitation X, it is clear that the first luminescent material has a wavelength dependent first absorption strength (which varies) over at least part of the first wavelength range $\Lambda_{x1}$. Hence, the first absorption strength may vary over at least part of the first wavelength range $\Lambda_{x1}$. The curves Λ1a and Λ1b schematically show two possible spectral power distributions of light source light 11. The spectral power distribution of the light source light 11 is controllable by controlling a current to the light source.

Referring to e.g. FIG. 2a, the light source light 11 may be switched from a first (light source spectral power distribution having a first centroid wavelength $\lambda_{c,1}$ to a second (light source) spectral power distribution having a centroid wavelength $\lambda_{c,2}$. The luminescent material may have an excitation spectrum having a maximum excitation intensity at $\lambda_{max,3}$. Especially, in embodiments $\lambda_{c,1}<\lambda_{c,2}\leq\lambda_{max,3}$.

For example, $\lambda_{max,3}-\lambda_{C,2}\leq 20$ nm, such as in embodiments ≤15 nm, like especially ≤10 nm, more especially ≤5 nm.

Here, in these schematically drawings the peak wavelengths may essentially the same as the centroid wavelengths. FIG. 2a is further explained in relation to peak wavelengths (though they may especially refer to centroid wavelengths).

Reference 11P2 indicates the peak wavelength of the spectral power distribution of Λ1b, and 11P1 indicates the peak wavelength of the spectral power distribution of Λ1a. The difference in peak wavelengths is indicated with Δ3. Reference λx1 indicates the peak maximum of the excitation X. The difference between the excitation maximum λx1 and the peak wavelength 11P2 of the spectral power distribution of Λ1b is indicated with reference Δ1; the difference between the excitation maximum λx1 and the peak wavelength 11P1 of the spectral power distribution of Λ1a is indicated with reference Δ2.

In embodiments, one of the primary first wavelength (i.e. e.g. the wavelength of 11P2) and the secondary first wavelength (i.e. e.g. the wavelength of 11P1) may be at a wavelength that is not within the wavelength range of an excitation maximum λx1 and full width half maximum of the excitation spectrum. Here, this would apply for of the spectral power distribution of Λ1b. The other one of the primary first wavelength (i.e. e.g. the wavelength of 11P2) and the secondary first wavelength (i.e. e.g. the wavelength of 11P1) may be at a wavelength that is within the wavelength range of an excitation maximum λx1 and full width half maximum of the excitation spectrum. Here, this would apply for of the spectral power distribution of Λ1a.

As will be clear from the spectra, when light source light 11 having Λ1b as spectral power distribution is provided, the system light 1001 may comprise first luminescent material light 211 see FIG. 2c and optionally also light source light 11 having the Λ1b spectral power distribution, but when light source light 11 having Λ1a as spectral power distribution is provided, the system light 1001 may comprise first luminescent material light 211 and essentially no light source light 11 having Λ1a as spectral power distribution see FIG. 2b. Hence, the ratio of the light source light 11 and the first luminescent material light 211 may be controllable by controlling the spectral power distribution of the light source light.

FIG. 2d schematically depicts a light generating system 1000 in an operational mode which may lead to the spectral power distribution of the system light 1001 as schematically depicted in FIG. 2b, and FIG. 2e schematically depicts a light generating system 1000 in an operational mode which may lead to the spectral power distribution of the system light 1001 as schematically depicted in FIG. 2c. Reference 300 indicates a control system. Reference 1100 refers to an end window, which may e.g. be defined by a diffuser element or a collimator. The end window 1100 may also be another type of beam shaping element, such as a lens, reflector, but may also be a light transmissive element without beam shaping function.

Hence, e.g. FIGS. 2d and 2d schematically depict an embodiment of the light generating system 1000 (in fact in two different operational modes). The light generating system 1000 may especially be configured to generate system light 1001. The light generating system 1000 comprises a light source 10, a first luminescent material 210, and a control system 300. Further, the light source 10 may be configured to generate light source light 11 having a tunable spectral power distribution within a first wavelength range $\Lambda_{x1}$. In embodiments, the light source 10 comprises a superluminescent diode. The first luminescent material 210 is configured to convert at least part of the light source light 11 into first luminescent material light 211 having one or more wavelengths in a first luminescent material light wavelength range $\Lambda_{m1}$. The first luminescent material 210 is configured such that in an operational mode (of the light generating system) the system light 1001 comprises the first luminescent material light 211. A spectral power distribution of the system light 1001 is controllable in dependence of the spectral power distribution of the light source light 11. The control system 300 is configured to control the spectral power distribution of the light source light 11. In embodiments, the first luminescent material 210 may have a wavelength dependent first absorption strength over at least part of the first wavelength range $\Lambda_{x1}$. In embodiments, the light source 10 and the first luminescent material 210 are configured such that in an operational mode the system light 1001 comprises the light source light 11 and the first luminescent material light 211. As schematically depicted the control system 300 is configured to control in an operational mode an intensity of the first luminescent material light 211 by changing the spectral power distribution of the light source light 11 (received by the first luminescent material 210) from a first light source light spectral power distribution Λ1a to a second light source light spectral power distribution Λ1b different from the first light source light spectral power distribution Λ1a. In specific embodiments, the first wavelength range $\Lambda_{x1}$ has wavelengths in the blue wavelength range. Alternatively or additionally, in embodiments the first luminescent material light wavelength range $\Lambda_{m1}$ has wavelengths in a wavelength range comprising one or more of at least part of the green wavelength range, at least part of the orange wavelength range, and at least part of the red wavelength range.

Figure 3A:
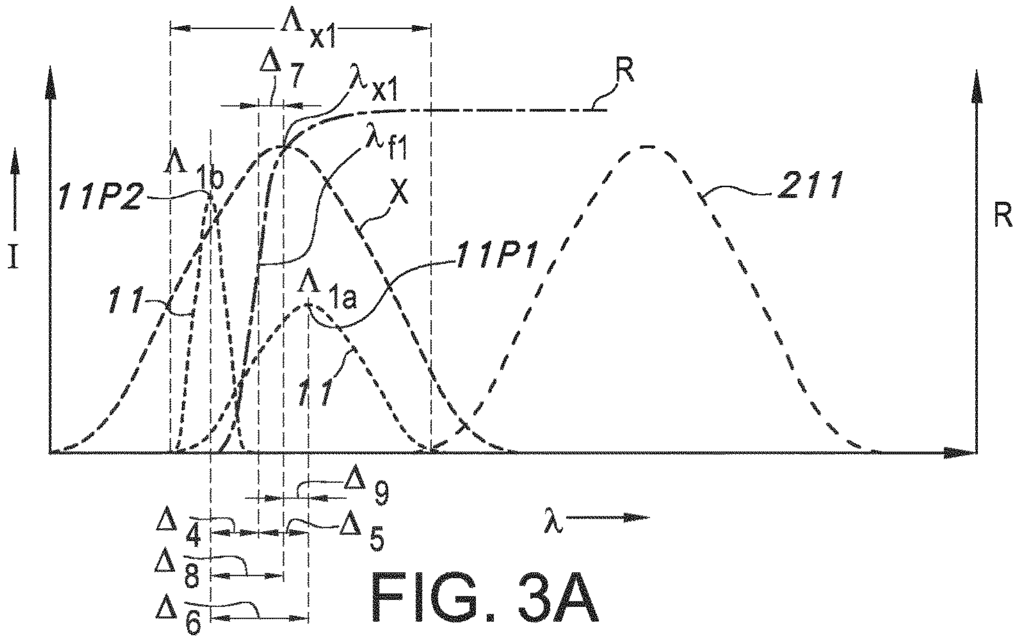
FIGS. 3*a*-3*e* schematically depicts some embodiments and aspects.
Figure 3B:
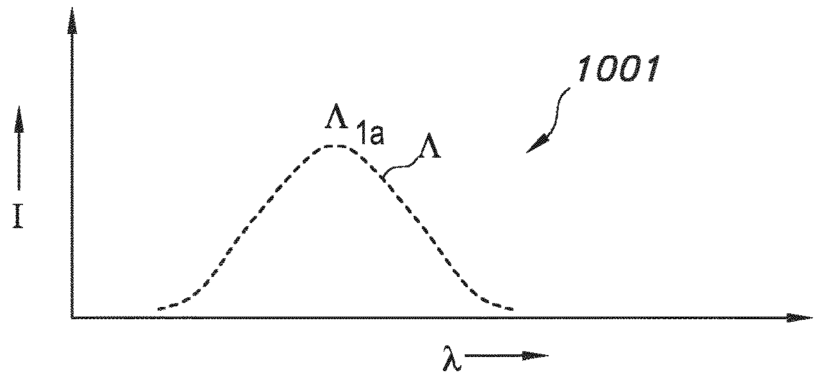
Figure 3C:
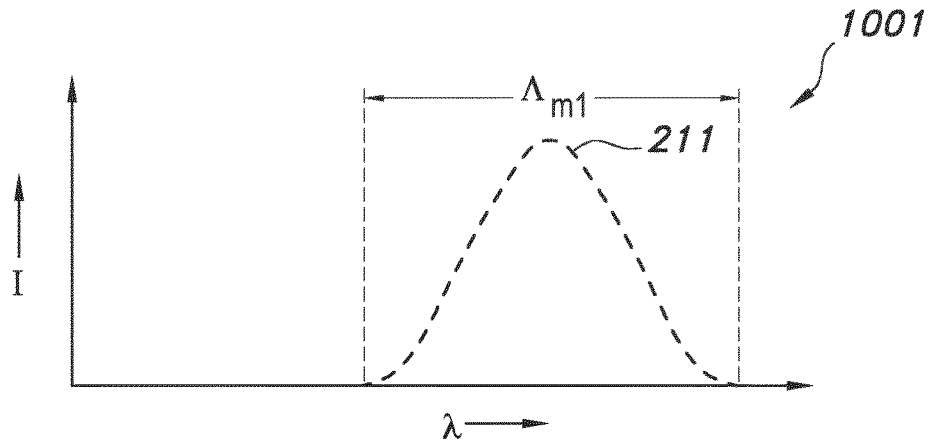
Figure 3D:
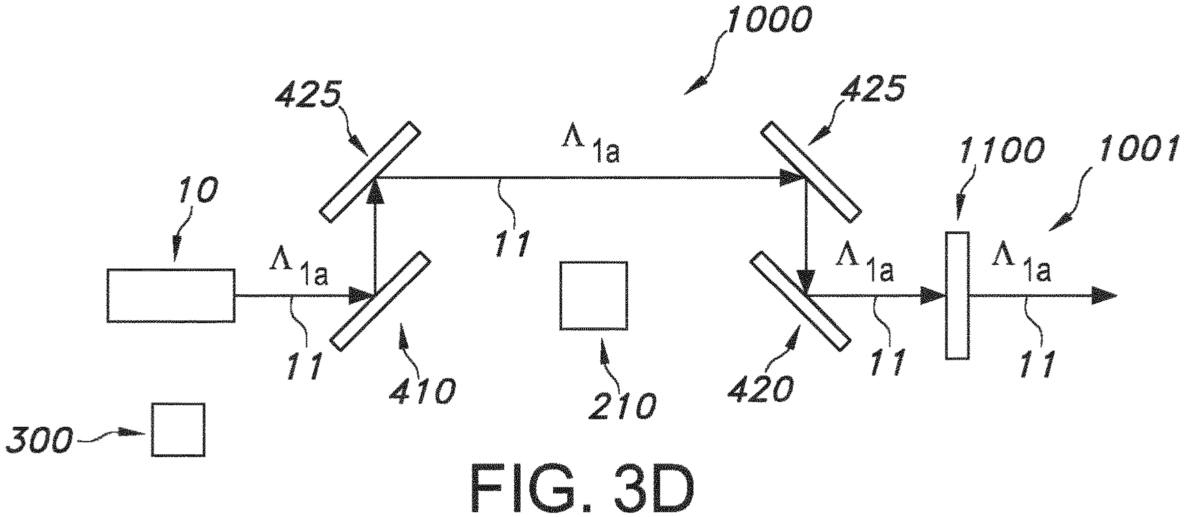
Figure 3E:
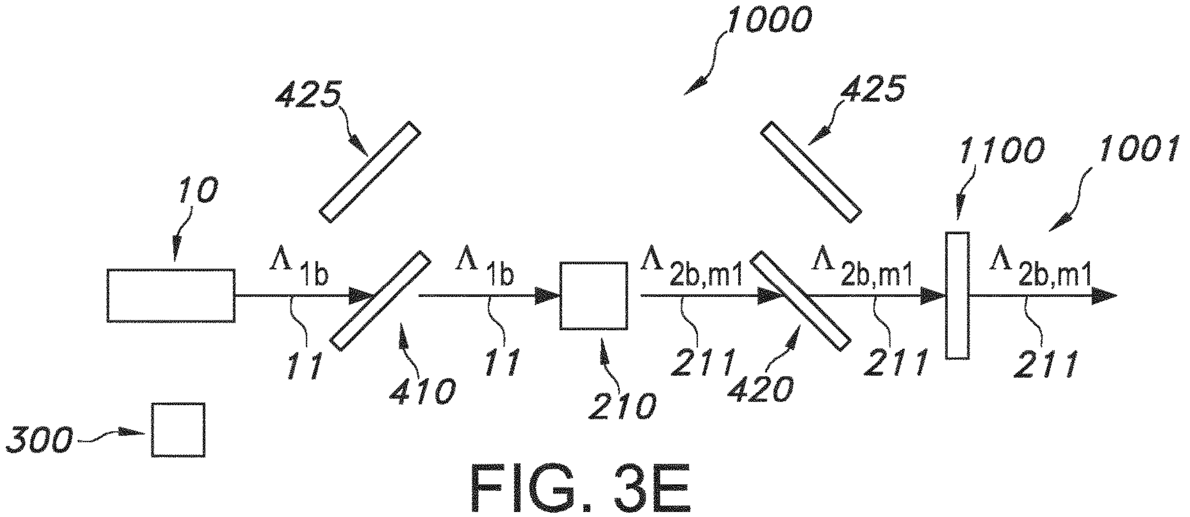

FIGS. 3a-3e schematically depict an embodiment and aspects in relation thereto wherein the system 1000 comprises a light source 10 a first luminescent material 210, and a color separation element 410 (see especially FIGS. 3d-3e). Reference 425 in FIGS. 3d-3e refers to reflective elements (or mirror elements). Reference Δ20 refers to light combining elements.

FIG. 3*a* shows the excitation spectrum X and the spectral power distribution of the emission spectrum, i.e. luminescent material light 211. Further, two light source light spectral power distributions Λ1*a* and Λ1*b* of the light source light 11 are schematically depicted. The dashed line R, which relates to the right y-axis, is the reflection curve of a color separation element. Note that in embodiments instead of the reflection curve, a transmission curve may be applied.

Here, λf1 is the wavelength between about the minimum and the maximum, i.e. at about 50% of the difference between the minimum and maximum reflection of the color separation element. Reference Δ4 indicates the wavelength difference between 11*p*2 and λf1. Reference Δ5 indicates is the wavelength difference between 11*p*1 and λf1.

Reference Δ6 indicates is the wavelength difference between 11*p*1 and 11*p*2. Reference Δ7 indicates is the wavelength difference between λx1 and λf1. Reference Δ8 indicates is the wavelength difference between 11*p*2 and λx1. Reference Δ9 indicates is the wavelength difference between 11*p*1 and λx1.

FIGS. 3*b* and 3*d* schematically depict an operational mode of the system 1000 wherein essentially all light source light 11 having a first light source light spectral power distribution Λ1*a* bypasses the first luminescent material 210 as the color separation element reflects this light source light 11. FIGS. 3*c* and 3*e* schematically depict an operational mode of the system 1000 wherein essentially all light source light 11 having a first light source light spectral power distribution Λ1*a* is transmitted by the color separation element 401 and irradiates the first luminescent material 210. By way of example, all light source light 11 is converted into first luminescent material light, leading to system light 1001 essentially consisting of the first luminescent material light 211.

Hence, in embodiments the light generating system 1000 may further comprising a color separation element 410 configured downstream of the light source 10. The light source 10, the color separation element 410, and the first luminescent material 210 are configured such that one or more of the following may applies: (i) a first part 11*b* of the light source light 11 may be directed from the color separation element 410 to the first luminescent material 210 and (ii) a second part 11*a* of the light source light 11 is not directed from the color separation element 410 to the first luminescent material 210. Thereby, a ratio of the first part to the second part depends on the spectral power distribution of the light source light 11. Especially, the color separation element 410 is selected from the group of a dichroic mirror, a dichroic cube, and a diffractive optical element. The light generating system 1000 may further comprise one or more light combining elements 420. Especially, in embodiments the light source 10, the color separation element 410, and the first luminescent material 210 may be configured such that the second part 11*a* of light source light 11 may be directed from the color separation element 410 to one or more of the one or more light combining elements 420. Further, in embodiments the light source 10, the color separation element 410, and the first luminescent material 210 may be configured such that the one or more light combining element 420 are configured to combine the first luminescent material light 211 and the second part 11*a* of light source light 11.

FIGS. 3*d* and 3*e* show embodiments and operational modes wherein either the light source light 11 or the first luminescent material light 211 may be comprised by the system light 1001. Note that in dependence of the steepness of the reflection curve R and the position of the reflection curve R of the color separation element 410, the system light 1001 of the operational mode schematically depicted in FIGS. 3*b*/3*d* may also comprise luminescent material light 211, and the system light 1001 of the operational mode schematically depicted in FIGS. 3*c*/3*e* may also comprise light source light 11. However, their ratios may be different, leading to different spectral power distributions of the system light 1001. Especially, in an operational mode the system light 1001 comprises the first luminescent material light 211 and the second part 11*a* of light source light 11.

FIGS. 4*a*-4*f* schematically depict embodiments and variants wherein a second luminescent material 220 is applied. Reference Δ20 refers to an embodiment of the light combining element, which may e.g. be light mixing optics. In embodiments, the light mixing optics may comprise one or more of diffusers (surface or volume scattering diffusers or engineered holographic optical elements), light pipes, light guides, Koehler integrator optics, etc. Alternatively or additionally, the light mixing optics may comprise a collimator or other collimating optics. Alternatively or additionally, the light mixing optics may comprise a dichroic beam combiner, such as in specific embodiments a dichroic cube.

Figure 4A:
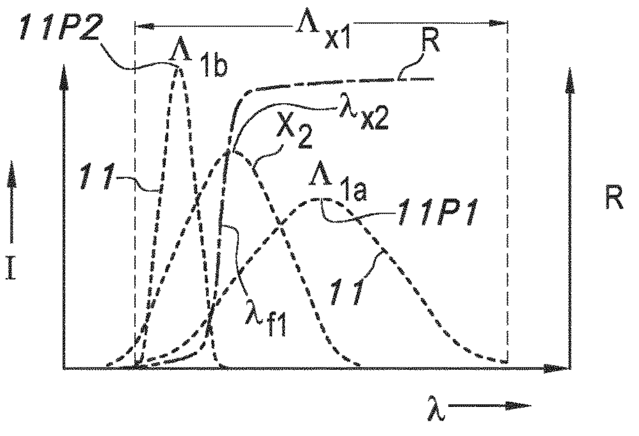
FIGS. 4*a*-4*f* schematically depicts some embodiments and aspects.
Figure 4B:
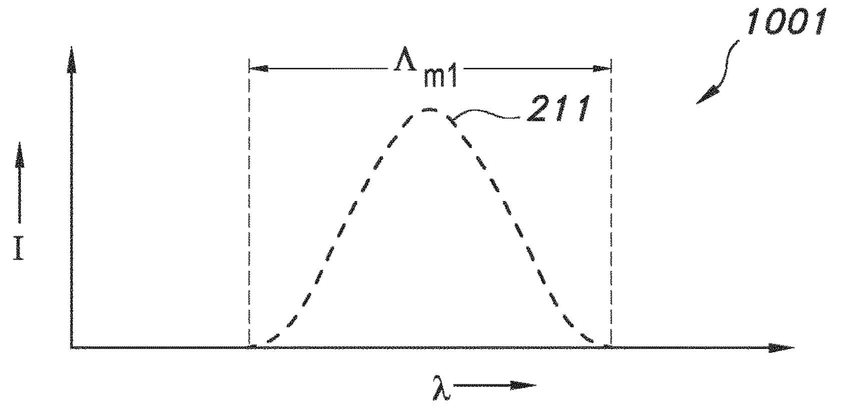
Figure 4C:
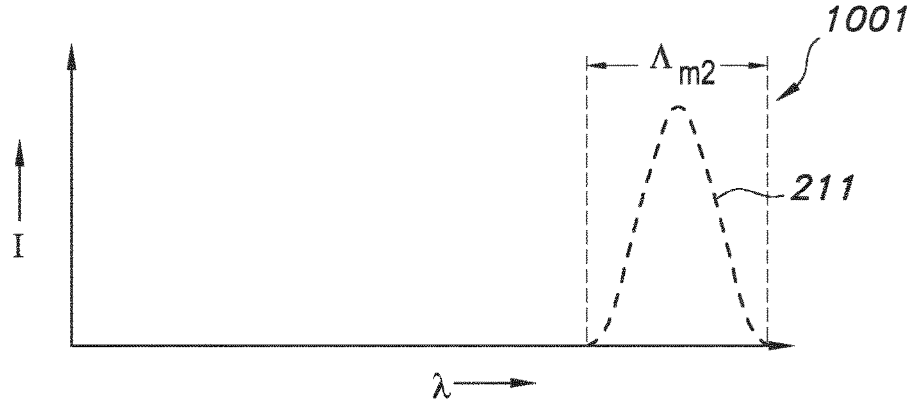
Figure 4D:
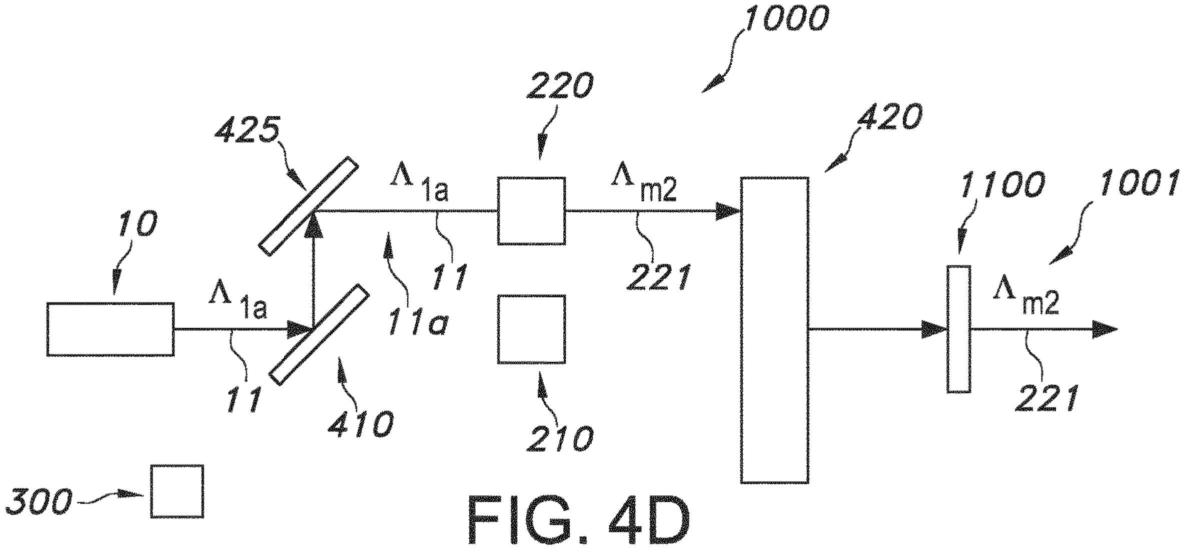
Figure 4E:
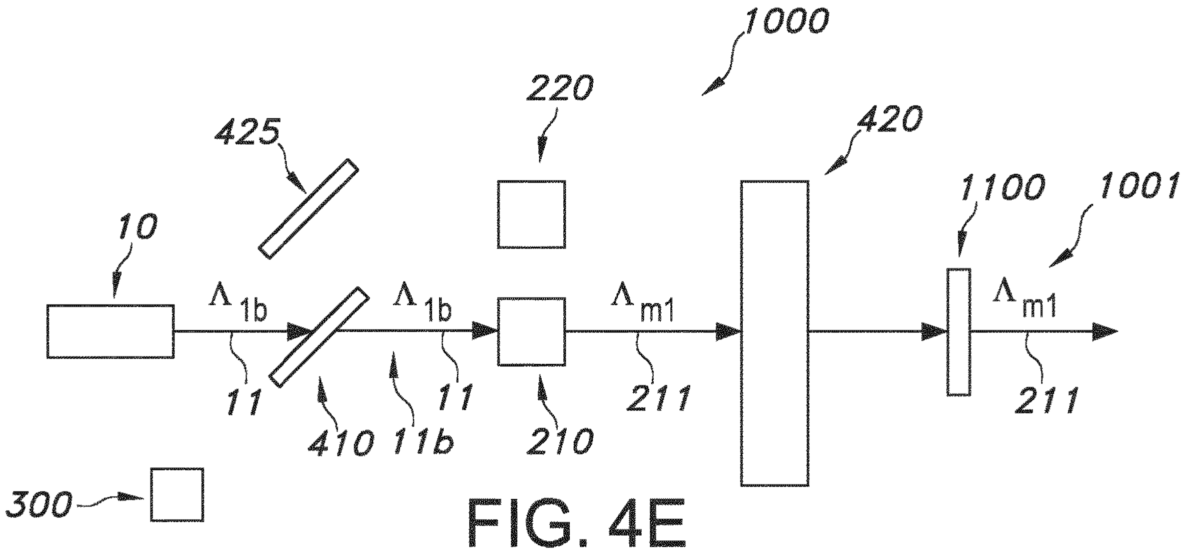
Figure 4F:
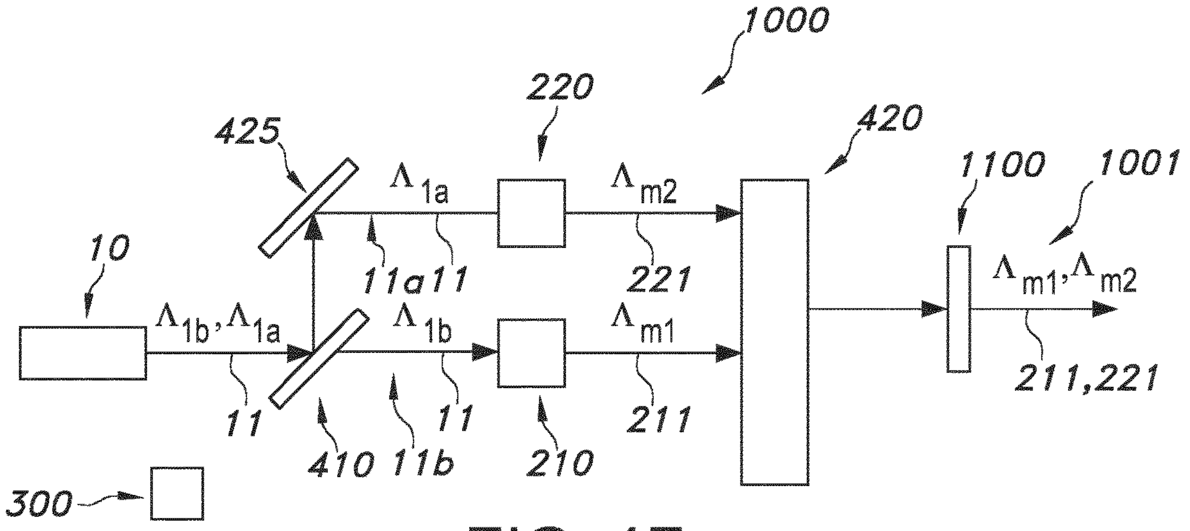

FIG. 4*a* schematically depicts the excitation spectrum X of the second luminescent material 220 (see FIGS. 4*d*, 4*e*, and 4*f*), the reflection curve R of the color separation element 410 (see FIGS. 4*d*, 4*e*, and 4*f*). FIG. 4*b* schematically depicts the first luminescent material light 211, having the first luminescent material light spectral power distribution Λm1. FIG. 4*c* schematically depicts the second luminescent material light 221, having the second luminescent material light spectral power distribution Λm2.

FIGS. 4*d* and 4*c* schematically depict an operational mode wherein essentially all light source light 11 bypasses the first luminescent material 210 and is guided to the second luminescent material 220 by the color separation element 410 (and a reflector 425), leading to second luminescent material light 221. FIGS. 4*e* and 4*b* schematically depict an operational mode wherein essentially all light source light 11 irradiates the first luminescent material 210 as it is guided by the color separation element 410 to the first luminescent material 210, leading to first luminescent material light 211.

As indicated above, in one or more operational modes it may also be possible that there is no full separation. FIG. 4*f* schematically depicts an embodiment wherein both the first luminescent material light 211 and the second luminescent material light 221 are comprised by the system light 1001. Further, it may be possible that also non-converted pump light, i.e. non-converted light source light 11 may be comprised by the system light.

Referring to FIGS. 4*a*-4*b*, in embodiments the light generating system 1000 may further comprise one or more light combining elements 420 and a second luminescent material 220. In embodiments, the second luminescent material 220 may be configured to convert at least part of the light source light 11 into second luminescent material light 221 having one or more wavelengths in a second luminescent material light wavelength range $\Lambda_{m2}$. Further, especially the first luminescent material light 211 and the second luminescent material light 221 have different spectral power distributions. In embodiments, the light source 10, the color separation element 410, and the second luminescent material 210 are configured such that the second part 11*a* of light source light 11 is directed from the color separation element 410 to second luminescent material 220. Especially, the one or more light combining element 420 may be configured to combine the first luminescent material light 211 and the second luminescent material light 221. In embodiments, in an operational mode the system light 1001 comprises the first luminescent material light 211 and/or the second luminescent material light 221. In specific embodiments, in an operational mode the system light 1001 comprises the first luminescent material light 211 and the second luminescent material light 221. In embodiments, the one or more light combining element 420 are selected from the group of a dichroic mirror and a dichroic cube. Especially, in embodiments the control system 300 is configured to control in an operational mode an intensity of the first luminescent material light 211 by changing the spectral power distribution of the light source light 11 from a first light source light spectral power distribution $\Lambda 1b$ to a second light source light spectral power distribution $\Lambda 1a$ different from the first light source light spectral power distribution $\Lambda 1b$.

In specific embodiments, the light source 10 comprises a GaN-based superluminescent diode, or an InGaN-based superluminescent diode, or an AlGaN-based superluminescent diode. Further, in specific embodiments the first luminescent material 210 comprises a luminescent material of the type $A_3B_5O_{12}$:Ce, wherein A comprises one or more of Y, La, Gd, Tb and Lu, and wherein B comprises one or more of Al, Ga, In and Sc.

In embodiments, the light source 10 and the first luminescent material 210 may be configured such that (in an operational mode) over at least part of the first wavelength range $\Lambda_{x1}$ the system light 1001 is white light. In other embodiments, the light source 10 and the first luminescent material 210 and the second luminescent material 220 may be configured such that (in an operational mode) over at least part of the first wavelength range $\Lambda_{x1}$ the system light 1001 is white light. The control system 300 may be configured to control one or more of the color rendering index and the correlated color temperature of the system light 1001.

Figure 5A:
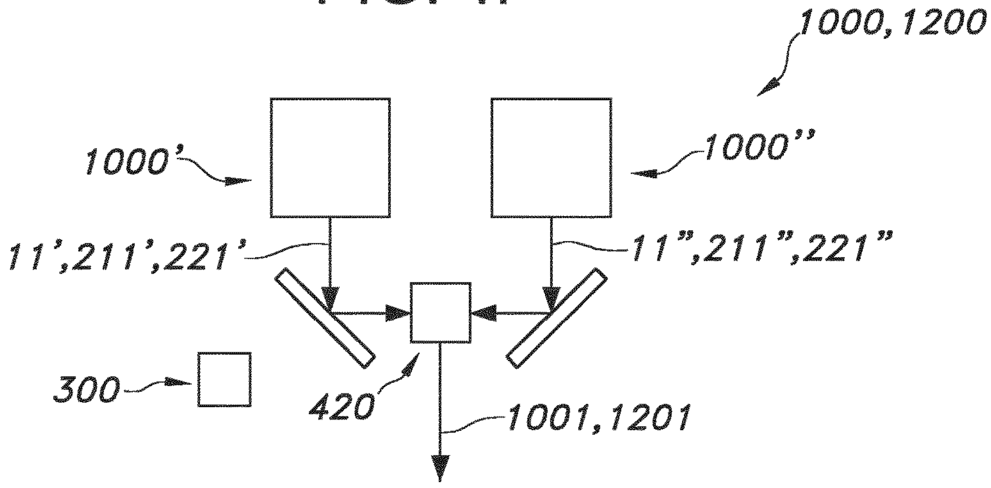
FIGS. 5*a*-5*b* schematically depict some further embodiments.
Figure 5B:
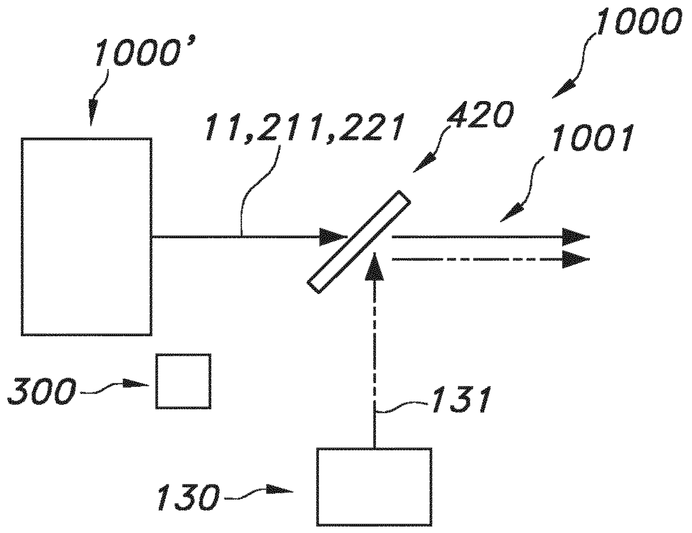

FIGS. 5*a*-5*b* schematically depict some further embodiments, wherein the light generating system is e.g. combined with or comprises a further source of light.

In FIG. 5*a* a first light generating 1000' and second light generating system 1000" may be combined to provide the light generating system 1000. The first light generating 1000' and second light generating system 1000" may be light generating systems 1000 as described herein, and may be essentially the same or may be able to provide different spectral power distributions.

In FIG. 5*b*, a first light generating system 1000', such as described herein, may be combined with a third source of light 130, which may provide third light 131, which may be comprised in the system light 1001 in one or more operational modes. For instance, the third source of light 130 may comprise one or more LEDs and/or one or more laser diodes and/or one or more SLDs.

Figure 6:
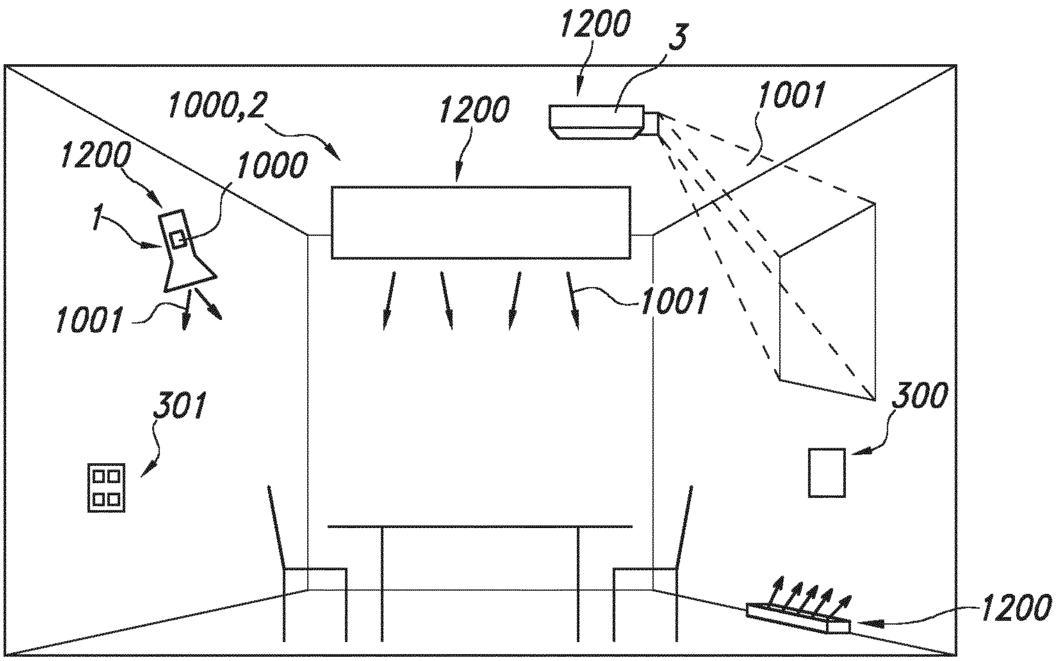
FIG. 6 schematically depicts some embodiments and applications.

FIG. 6 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 6 also schematically depicts an embodiment of lamp 1 comprising the light generating system 1000. Reference 3 indicates a projector device or projector system, which may be used to project images, such as at a wall, which may also comprise the light generating system 1000. Reference 1200 refers to a lighting device, which may e.g. be selected from the group of a lamp 1, a luminaire 2, a projector device 3. The lighting device 1200 comprises the light generating device 1000. However, in embodiments the lighting device 1200 may also comprise a disinfection device or an optical wireless communication device (comprising the light generating device 1000). FIG. 6 also schematically depicts an embodiment of the lighting device 1200 comprising a wall light device (such as especially wall washers).

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system, configured to generate system light, wherein the light generating system comprises a light source, a first luminescent material, and a control system, wherein:

the light source is configured to generate light source light having a tunable spectral power distribution within a first wavelength range ($\Lambda_{x1}$); wherein the light source comprises a superluminescent diode;

the first luminescent material is configured to convert at least part of the light source light into first luminescent material light having one or more wavelengths in a first luminescent material light wavelength range ($\Lambda_{m1}$);

the first luminescent material is configured such that in an operational mode the system light comprises the first luminescent material light;

a spectral power distribution of the system light is controllable in dependence of the spectral power distribution of the light source light; and the control system is configured to control the spectral power distribution of the light source light, the light generating system further comprising a color separation element configured downstream of the light source and upstream of the first luminescent material, wherein:

the color separation element having a wavelength dependent transmission and/or a wavelength dependent reflection within the first wavelength range ($\Lambda_{x1}$), and;

the light source, the color separation element, and the first luminescent material are configured such that one or more of the following applies: (i) a first part of the light source light is directed from the color separation element to the first luminescent material and (ii) a second part of the light source light is not directed from the color separation element to the first luminescent material, and;

the light generating system further comprising one or more light combining elements, wherein:

the light source, the color separation element, and the first luminescent material are configured such that the second part of light source light is directed from the color separation element to one or more of the one or more light combining elements;

the one or more light combining element are configured to combine the first luminescent material light and the second part of light source light;

in an operational mode the system light comprises the first luminescent material light and the second part of light source light.

2. The light generating system according to claim 1, wherein the first luminescent material has a wavelength dependent first absorption strength over at least part of the first wavelength range ($\Lambda_{x1}$).

3. The light generating system according to claim 2, wherein the light source and the first luminescent material are configured such that in an operational mode at different wavelengths of the light source light selected from the first wavelength range ($\Lambda_{x1}$) the system light comprises the light source light and the first luminescent material light, wherein the first luminescent material light is based on conversion of the light source light at the different wavelengths by the first luminescent material.

4. The light generating system according to claim 2, wherein the control system is configured to control in an operational mode an intensity of the first luminescent material light by changing the spectral power distribution of the light source light from a first light source light spectral power distribution to a second light source light spectral power distribution different from the first light source light spectral power distribution.

5. The light generating system according to claim 1, wherein:

the first wavelength range ($\Lambda_{x1}$) has wavelengths in the blue wavelength range; and the first luminescent material light wavelength range ($\Lambda_{m1}$) has wavelengths in a wavelength range comprising one or more of (i) at least part of the green wavelength range, (ii) at least part of the orange wavelength range, and (iii) at least part of the red wavelength range.

6. The light generating system according to claim 1, wherein the first part of the light source light is directed from the color separation element to the first luminescent material and the second part of the light source light is not directed from the color separation element to the first luminescent material; and a ratio of the first part to the second part depends on the spectral power distribution of the light source light.

7. The light generating system according to claim 1, wherein the color separation element is selected from the group of a dichroic mirror, a dichroic cube, and a diffractive optical element.

8. The light generating system according to claim 1, the first wavelength range ($\Lambda$x1) within which the spectral power distribution being tunable is in the range of 5-40 nm.

9. The light generating system according to claim 1, further comprising one or more light combining elements and a second luminescent material, wherein:

the second luminescent material is configured to convert at least part of the light source light into second luminescent material light having one or more wavelengths in a second luminescent material light wavelength range ($\Lambda_{m2}$);

the first luminescent material light and the second luminescent material light have different spectral power distributions;

the light source, the color separation element, and the second luminescent material are configured such that the second part of light source light is directed from the color separation element to second luminescent material;

the one or more light combining element are configured to combine the first luminescent material light and the second luminescent material light;

in an operational mode the system light comprises the first luminescent material light and the second luminescent material light.

10. The light generating system according to claim 8, wherein the one or more light combining element are selected from the group of a dichroic mirror, a dichroic cube, a diffuser, a light pipe, a light guide, and a Koehler integrator optics.

11. The light generating system according to claim 1, wherein the control system is configured to control in an operational mode an intensity of the first luminescent material light by changing the spectral power distribution of the light source light from a first light source light spectral power distribution to a second light source light spectral power distribution different from the first light source light spectral power distribution.

12. The light generating system according to claim 1, wherein the spectral power distribution of the light source light is controllable by controlling a current to the light source, and wherein the control system is configured to control an intensity of the light source light by pulse-width modulation.

13. The light generating system according to claim 1, wherein the light source comprises a GaN-based superluminescent diode, or an InGaN-based superluminescent diode, or an AlGaN-based superluminescent diode; and wherein the first luminescent material comprises a luminescent material of the type $A_3B_5O_{12}$:Ce, wherein A comprises one or more of Y, La, Gd, Tb and Lu, and wherein B comprises one or more of Al, Ga, In and Sc.

14. The light generating system according to claim 1, wherein the light source and the first luminescent material, and an second luminescent material, are configured such that in an operational mode at different wavelengths of the light source light selected from of the first wavelength range ($\Lambda_{x1}$), the system light is white light based on conversion of the light source light at the different wavelengths by the first luminescent material and optionally by the second luminescent material; and wherein the control system is configured to control one or more of the color rendering index and the correlated color temperature of the system light.

15. A light generating device selected from the group of a lamp, a luminaire, a projector device, a disinfection device, and an optical wireless communication device, comprising the light generating system according to claim 1.

* * * * *